(12) United States Patent  (10) Patent No.: US 11,302,275 B2
Wang  (45) Date of Patent: Apr. 12, 2022

(54) METHOD AND DEVICE FOR ADJUSTING GREYSCALE OF DISPLAY PANEL SOLVING PROBLEM OF INEFFECTIVENESS OF ELIMINATING UNEVENNESS CAUSED BY INACCURATE MURA COMPENSATION VALUE

(71) Applicants: HKC CORPORATION LIMITED, Guangdong (CN); CHONGQING HKC OPTOELECTRONICS TECHNOLOGY CO., LTD., Chongqing (CN)

(72) Inventor: Mingliang Wang, Chongqing (CN)

(73) Assignees: HKC CORPORATION LIMIIED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 164 days.

(21) Appl. No.: 16/625,146

(22) PCT Filed: Jun. 22, 2018

(86) PCT No.: PCT/CN2018/092368
§ 371 (c)(1),
(2) Date: Dec. 20, 2019

(87) PCT Pub. No.: WO2019/001355
PCT Pub. Date: Jan. 3, 2019

(65) Prior Publication Data
US 2021/0335296 A1    Oct. 28, 2021

(30) Foreign Application Priority Data
Jun. 26, 2017   (CN) .......................... 201710497582.2

(51) Int. Cl.
*G09G 3/36* (2006.01)
*G09G 3/28* (2013.01)
(Continued)

(52) U.S. Cl.
CPC .......... *G09G 3/3648* (2013.01); *G09G 3/006* (2013.01); *G09G 3/2803* (2013.01); *G09G 3/36* (2013.01);
(Continued)

(58) Field of Classification Search
None
See application file for complete search history.

(56) References Cited

U.S. PATENT DOCUMENTS

2012/0206504 A1\* 8/2012 Ha ........................ G09G 3/3208
345/690
2013/0107152 A1\* 5/2013 Okumura ............ G02F 1/13306
349/41
2016/0225344 A1 8/2016 Joo et al.

FOREIGN PATENT DOCUMENTS

CN         105185286 A     12/2015
CN         105575326 A      5/2016
(Continued)

OTHER PUBLICATIONS

CNIPA Office Action, dated Oct. 16, 2017, for HKC Corporation Limited et al., Application No. 201710497582.2, Filed Jun. 26, 2017.
(Continued)

*Primary Examiner* — Chad M Dicke
(74) *Attorney, Agent, or Firm* — Law Offices of Albert Wai-Kit Chan, PLLC

(57) ABSTRACT

The present disclosure discloses a method and device (302) for adjusting grayscale of display panel, the method includes: performing image capture on the display panel,
(Continued)

and obtaining a current image (S10); identifying an uneven area in the current image, and detecting original output brightness and original input grayscale of the uneven area (S20); determining a target input grayscale corresponding to a preset target brightness according to actual Gamma curve value which is obtained by testing the display panel (S30); using the difference between the original input grayscale and the target input grayscale as grayscale compensation value of the uneven area (S40).

16 Claims, 5 Drawing Sheets

(51) Int. Cl.
*G09G 5/10* (2006.01)
*G09G 3/00* (2006.01)
*H04N 1/407* (2006.01)
*H04N 9/04* (2006.01)

(52) U.S. Cl.
CPC ......... *G09G 3/3607* (2013.01); *G09G 3/3611* (2013.01); *G09G 5/10* (2013.01); *H04N 1/4078* (2013.01); *H04N 9/04513* (2018.08); *G09G 2310/027* (2013.01); *G09G 2320/029* (2013.01); *G09G 2320/0233* (2013.01); *G09G 2320/0247* (2013.01); *G09G 2320/0626* (2013.01); *G09G 2320/0673* (2013.01); *G09G 2330/12* (2013.01); *G09G 2360/145* (2013.01); *G09G 2360/16* (2013.01)

(56) References Cited

FOREIGN PATENT DOCUMENTS

| CN | 105741775 A | 7/2016 |
|---|---|---|
| CN | 106782283 A | 5/2017 |
| CN | 107045863 A | 8/2017 |

OTHER PUBLICATIONS

International Search Report, dated Sep. 29, 2018, for HKC Corporation Limited et al., International Application No. PCT/CN2018/092368, Filed Jun. 22, 2018.
Written Opinion, dated Sep. 29, 2018, for HKC Corporation Limited et al., International Application No. PCT/CN2018/092368, Filed Jun. 22, 2018.

* cited by examiner

METHOD AND DEVICE FOR ADJUSTING GREYSCALE OF DISPLAY PANEL SOLVING PROBLEM OF INEFFECTIVENESS OF ELIMINATING UNEVENNESS CAUSED BY INACCURATE MURA COMPENSATION VALUE

FIELD

The present disclosure relates to the field of displaying of liquid crystal panel, and more particularly to a method and device for adjusting greyscale of display panel.

BACKGROUND

Due to complicated production process and difficult control, unevenness of brightness displaying (also called mura) is easy to occur during the production process of a liquid crystal panel, that is, a phenomenon of blocky marks due to differences in displaying brightness in a certain area of the panel, which reduces the quality level of the panel. In recent years, with the popularity of televisions such as 2K and 4K, the phenomenon of unevenness has become more and more serious, in order to solve the unevenness, technology for eliminating unevenness (also called Demura) has emerged, the eliminating unevenness technology belongs to a kind of external compensation technology, currently this technology is mainly to illuminate the backplane, through a CCD (Charge-coupled Device) optical camera to extract brightness signals, detect the unevenness of a display image, based on a central area of the panel, by comparison differences between the brightness of other areas and the center area of the panel, and then calculate the display data to be compensated according to a standard Gamma 2.2 curve (currently the Gamma value of most displays is 2.2), so that the brightness of the whole panel is uniform.

At present, the technology for eliminating unevenness has advantages of simple structure and flexible mode, therefore it is widely used at the present stage; however, a premise of calculating the compensation data is that the panel is supposed to have the standard Gamma 2.2 curve, while it is impossible to control Gamma curve of each piece precisely in actual production process of the panel, which causes uneven grayscale compensation value to be inaccurate and easily affects final effect of Demura.

The above content is only used to assist in understanding technical solutions of present disclosure, and does not constitute an admission that the above is prior art.

SUMMARY

The present disclosure is to provide a method and device for adjusting greyscale of display panel, which aims to solve the problems of ineffectiveness of eliminating unevenness caused by inaccurate mura compensation value during process of manufacturing the liquid crystal display panel.

In order to achieve the above aim, the present disclosure provides the method for adjusting greyscale of display panel, which includes:

Performing image capture on the display panel, and obtaining a current image;

Identifying an uneven area in the current image, and detecting original output brightness and original input grayscale of the uneven area;

Determining target input grayscale corresponding to preset target brightness according to actual Gamma curve value which is obtained by testing the display panel;

Using the difference between the original input grayscale and the target input grayscale as grayscale compensation value of the uneven area;

Obtaining a plurality of target brightness values respectively corresponding to a plurality of preset grayscale except 255 grayscale according to the actual Gamma curve;

Obtaining a first common voltage which makes flicker value of the display panel to be a preset flicker value when the display panel displays a 255 grayscale image;

Obtaining a second common voltage via increasing or decreasing the first common voltage by a preset voltage offset;

Inputting the second common voltage to the display panel, and sequentially inputting a plurality of initial grayscale voltages corresponding to the plurality of preset grayscale to the display panel, continuously adjusting each initial grayscale voltage until the brightness of the display panel reaches the target brightness value corresponding to preset grayscale corresponding to the initial grayscale voltage every time the initial grayscale voltage is input, and obtaining a plurality of modified grayscale voltages corresponding to the plurality of preset grayscale;

Driving the display panel to display by using the second common voltage, the plurality of modified grayscale voltages, and a preset initial grayscale voltage corresponding to 255 grayscale.

Optionally, prior to determining the target input grayscale corresponding to the preset target brightness according to the actual Gamma curve value, the method further includes:

Obtaining n reference images of the display panel with different input grayscale, wherein n is an integer greater than or equal to 2;

Calculating a reference Gamma curve value of each reference image;

Using an average of the reference Gamma curve values as an actual Gamma curve value.

Optionally, n is an integer greater than or equal to 5.

Optionally, calculating the reference Gamma curve value of each reference image specifically includes:

Detecting reference input grayscale and reference output brightness of each reference image;

Calculating the reference Gamma curve value of each reference image according to the reference input grayscale, the reference output brightness, and a Gamma mathematical model; the Gamma mathematical model representing a correspondence relationship between the reference input grayscale and the reference output brightness.

Optionally, the Gamma mathematical model is:

$$\frac{Tx - To}{T255 - To} = \left(\frac{Lx}{255}\right)^{Gamma}$$

Wherein, Tx is the reference output brightness, T255 is corresponding output brightness when input grayscale is 255, To is the corresponding output brightness when the input grayscale is 0, Lx is the reference input grayscale, and Gamma is the actual Gamma curve value.

Optionally, prior to determining the target input grayscale corresponding to the preset target brightness according to the actual Gamma curve value, the method further includes:

Obtaining output brightness of a center point of the current image;

Using the output brightness of the center point of the current image as the preset target brightness.

Optionally, prior to determining the target input grayscale corresponding to the preset target brightness according to the actual Gamma curve value, the method further includes:

Obtaining output brightness of each pixel in other areas except the uneven area in the current image;

Using an average value of obtained output brightness as the preset target brightness.

Optionally, subsequent to using the difference between the original input grayscale and the target input grayscale as the grayscale compensation value of the uneven area, the method further includes:

Transmitting the grayscale compensation value to the display panel, allowing the display panel to use a result of adding the grayscale compensation value to the original input grayscale of the uneven area as a new input grayscale of the uneven area, so as to eliminate the uneven area in the current image.

Optionally, the method further includes burning the grayscale compensation value into a memory, so as to achieve a compensation effect of the current image.

Optionally, the display panel is a liquid crystal display panel.

Optionally, the liquid crystal display panel could be applied to a computer display screen, a television display screen, and a tablet computer display screen.

Optionally, specific process of obtaining the actual Gamma curve of the display panel is: providing a brilliance sensing device, making the display panel respectively display 0 grayscale image and 255 grayscale image, using the brilliance sensing device to obtain the brightness of the display panel displaying 0 grayscale image and 255 grayscale image, using the brightness of the display panel displaying 0 grayscale image and 255 grayscale image and the preset actual Gamma value to obtain the actual Gamma curve of the display panel.

Optionally, the brightness of the display panel is detected by an identification module, so as to determine whether the brightness of the display panel reaches the target brightness value.

Optionally, the voltage offset is greater than 0 and less than or equal to 2V.

Optionally, obtaining the first common voltage which makes flicker value of the display panel to be the preset flicker value when the display panel displays the 255 grayscale image, specifically, inputting an initial common voltage and a preset initial grayscale voltage corresponding to 255 grayscale to the display panel, which causes the display panel to display the 255 grayscale image, the flicker value of the display panel is being detected while the initial common voltage is adjusted, until the flicker value of the display panel is the preset flicker value, and the first common voltage is obtained.

Optionally, two unequal initial grayscale voltages are preset corresponding to each preset grayscale.

In addition, in order to achieve the above aim, the present disclosure further provides a device for adjusting greyscale of display panel, which includes:

An image capture module, configured for performing image capture on the display panel, and obtaining a current image;

An identification module, configured for identifying an uneven area in the current image, and detecting original output brightness and original input grayscale of the uneven area;

A computing module, configured for determining target input grayscale corresponding to preset target brightness according to actual Gamma curve value which is obtained by testing the display panel; and An adjustment module, configured for using the difference between the original input grayscale and the target input grayscale as grayscale compensation value of the uneven area.

Optionally, the image capture module is an optical CCD camera.

Optionally, the identification module is further configured to detect brightness of the display panel, so as to determine whether the brightness of the display panel reaches the target brightness value.

In addition, in order to achieve the above aim, the present disclosure further provides a display device, wherein, the device includes a display panel and the device for adjusting greyscale of display panel as described above.

The method for adjusting greyscale of display panel in the present disclosure, could perform greyscale value compensation of the uneven area of the display panel according to the actual Gamma curve and preset target brightness during the producing process of each liquid crystal panel, which achieves the most accurate compensation effect, then eliminating unevenness in the display panel accurately and effectively, thereby solving the problem of ineffectiveness of eliminating unevenness caused by inaccurate mura compensation value during process of producing the liquid crystal display panel, meanwhile, the present disclosure could drive the display panel to display by using the second common voltage, the plurality of modified grayscale voltages, and the preset initial grayscale voltage corresponding to 255 grayscale, which could generate residual direct current in the area displaying 255 grayscale, and then counteract the brightness difference with other areas when displaying other greyscale images, which improves reverse image sticking effectively and improves display quality.

BRIEF DESCRIPTION OF THE ACCOMPANYING DRAWINGS

The realizing of the aim, functional characteristics, advantages of the present disclosure are further described in detail with reference to the accompanying drawings and the embodiments.

DETAILED DESCRIPTION OF ILLUSTRATIVE EMBODIMENTS

It is to be understood that, the specific embodiments described herein portrays merely some illustrative embodiments of the present disclosure, and are not intended to limit the patentable scope of the present disclosure.

Figure 1:
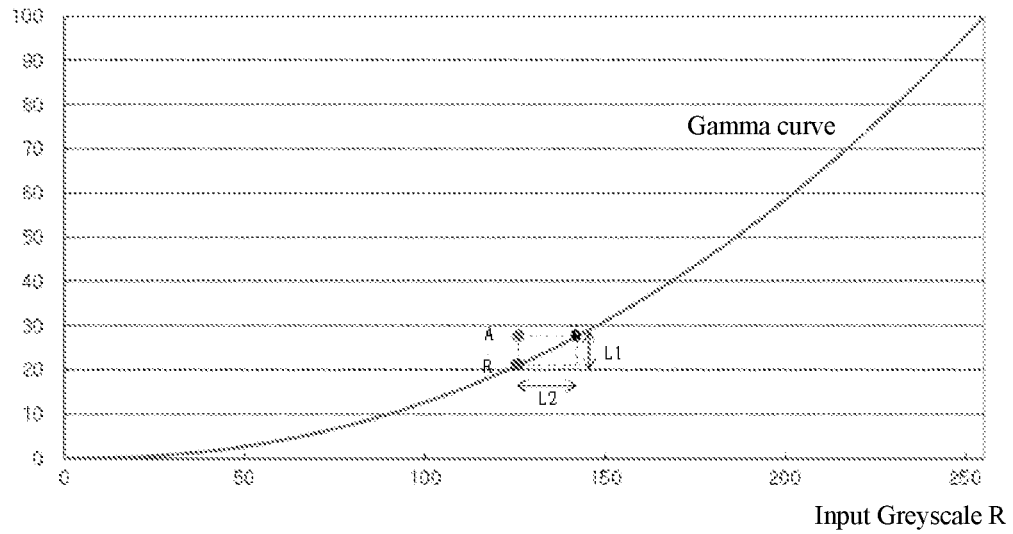
FIG. 1 is a schematic diagram illustrating a conventional method of acquiring a grayscale compensation value of display panel.

Currently the technology for eliminating unevenness (also called Demura) has advantages of simple structure and flexible mode, therefore it is widely used at the present stage; however, a premise of calculating the compensation data is that the panel is supposed to have the standard Gamma 2.2 curve, while it is impossible to control Gamma curve of each piece precisely in actual production process of the panel, which easily affects final effect of Demura. As shown in FIG. 1, it is the principle of calculating the compensation data of Demura technology which is widely used, in the Gamma curve in FIG. 1, abscissa is input grayscale R (i.e., an objective quantity of things), and ordinate is output brightness T (i.e., subjective brightness perception), at this stage, in order to facilitate calculation, assuming that the Gamma curve is 2.2, in the figure Point A represents target brightness, and Point R represents actual brightness of an uneven area, in order to increase the brightness of the uneven area to the target brightness of the display panel (that is, achieving an effect of obtaining compensation brightness L1 as shown in the figure), compensation grayscale L2 corresponding to the abscissa on the Gamma 2.2 curve should be acquired. The shortcoming of this approach is that if actual Gamma curve of the panel is not 2.2, then compensation effect would be biased, and even the unevenness mura would not be improved.

Figure 2:
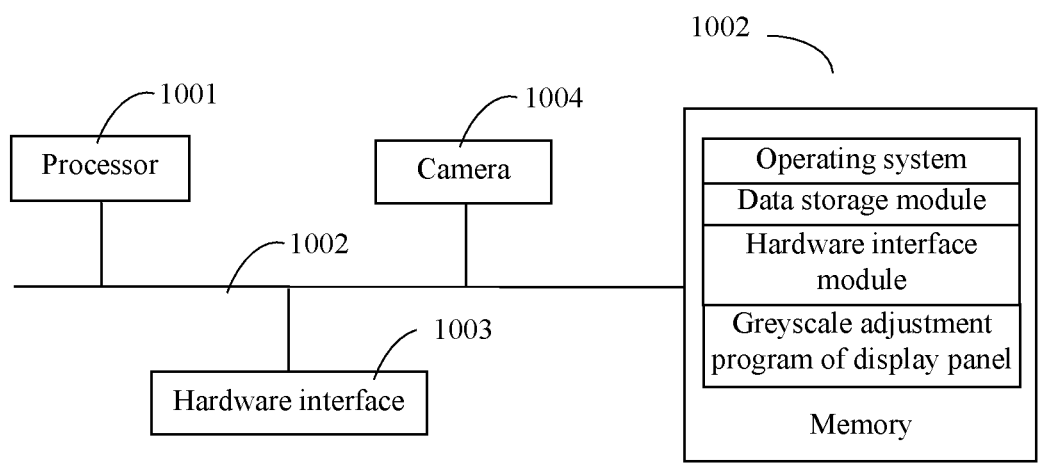
FIG. 2 is a schematic diagram illustrating a device for adjusting greyscale of display panel of hardware operating environment according to an embodiment of the present disclosure.

Referring to FIG. 2, FIG. 2 is a schematic diagram illustrating a device for adjusting greyscale of display panel of hardware operating environment according to an embodiment of the present disclosure;

As shown in FIG. 2, the device may include a processor 1001, such as CPU, communication bus 1002, hardware interface 1003, a camera 1004, and a memory 1005. The communication bus 1002 is used to implement connection communication between these components. The hardware interface 1003 may include a liquid crystal display panel. The camera 1004 could optionally be as a high-precision high-resolution optical CCD camera that could achieve resolution of human eyes. The memory 1005 may be a high speed RAM memory or a non-volatile memory, and may include an EEPROM (Electrically Erasable Programmable Read-Only Memory) electrically erasable programmable read-only memory.

It could be understood by those skilled in the art that the device structure illustrated in FIG. 2 does not constitute a limitation to the device, and may include more or less components than those illustrated, or combine some components, or different component arrangements.

As shown in FIG. 2, the memory 1005 as a computer storage medium may include an operating system, a data storage module, a hardware interface module, and a grayscale adjustment program of the display panel.

In the device shown in FIG. 2, the camera 1004 is configured to perform image capture on the display panel; the hardware interface 1003 is mainly used for data interaction with the display panel; the processor 1001 and the memory 1005 in the present disclosure may be disposed in the device, the device invokes the grayscale adjustment program of the display panel stored in the memory 1005 by the processor 1001, and performs following operations:

Performing image capture on the display panel, and obtaining a current image;

Identifying an uneven area in the current image, and detecting original output brightness and original input grayscale of the uneven area;

Determining target input grayscale corresponding to preset target brightness according to actual Gamma curve value which is obtained by testing the display panel;

Using the difference between the original input grayscale and the target input grayscale as grayscale compensation value of the uneven area;

Obtaining a plurality of target brightness values respectively corresponding to a plurality of preset grayscale except 255 grayscale according to the actual Gamma curve;

Obtaining a first common voltage which makes flicker value of the display panel to be a preset flicker value when the display panel displays a 255 grayscale image;

Obtaining a second common voltage via increasing or decreasing the first common voltage by a preset voltage offset;

Inputting the second common voltage to the display panel, and sequentially inputting a plurality of initial grayscale voltages corresponding to the plurality of preset grayscale to the display panel, continuously adjusting each initial grayscale voltage until the brightness of the display panel reaches the target brightness value corresponding to preset grayscale corresponding to the initial grayscale voltage every time the initial grayscale voltage is input, and obtaining a plurality of modified grayscale voltages corresponding to the plurality of preset grayscale;

Driving the display panel to display by using the second common voltage, the plurality of modified grayscale voltages, and a preset initial grayscale voltage corresponding to 255 grayscale.

Further, the processor 1001 may invoke the grayscale adjustment program of the display panel stored in the memory 1005, and further perform the following operations:

Obtaining n reference images of the display panel with different input grayscale, wherein n is an integer greater than or equal to 2;

Calculating a reference Gamma curve value of each reference image;

Using an average of the reference Gamma curve values as an actual Gamma curve value.

Further, the processor 1001 may invoke the grayscale adjustment program of the display panel stored in the memory 1005, and further perform the following operations:

Detecting reference input grayscale and reference output brightness of each reference image;

Calculating the reference Gamma curve value of each reference image according to the reference input grayscale, the reference output brightness, and a Gamma mathematical model; the Gamma mathematical model representing a correspondence relationship between the reference input grayscale and the reference output brightness.

Further, the processor 1001 may invoke the grayscale adjustment program of the display panel stored in the memory 1005, and further perform the following operations:

Obtaining output brightness of a center point of the current image, and using the output brightness of the center point of the current image as the preset target brightness.

Further, the processor 1001 may invoke the grayscale adjustment program of the display panel stored in the memory 1005, and further perform the following operations:

Obtaining output brightness of each pixel in other areas except the uneven area in the current image;

Using an average value of obtained output brightness as the preset target brightness.

Further, the processor 1001 may invoke the grayscale adjustment program of the display panel stored in the memory 1005, and further perform the following operations:

Transmitting the grayscale compensation value to the display panel, allowing the display panel to use a result of adding the grayscale compensation value to the original input grayscale of the uneven area as a new input grayscale of the uneven area, so as to eliminate the uneven area in the current image.

Further, the processor 1001 may invoke the grayscale adjustment program of the display panel stored in the memory 1005, and further perform the following operations:

Providing a brilliance sensing device, making the display panel respectively display 0 grayscale image and 255 grayscale image, using the brilliance sensing device to obtain the brightness of the display panel displaying 0 grayscale image and 255 grayscale image, using the brightness of the display panel displaying 0 grayscale image and 255 grayscale image and the preset actual Gamma value to obtain the actual Gamma curve of the display panel.

In this embodiment of the present disclosure, performing image capture on the display panel, and obtaining a current image; identifying an uneven area in the current image, and detecting original output brightness and original input grayscale of the uneven area; determining target input grayscale corresponding to preset target brightness according to actual Gamma curve value which is obtained by testing the display panel; using the difference between the original input grayscale and the target input grayscale as grayscale compensation value of the uneven area; obtaining a plurality of target brightness values respectively corresponding to a plurality of preset grayscale except 255 grayscale according to the actual Gamma curve; obtaining a first common voltage which makes flicker value of the display panel to be a preset flicker value when the display panel displays a 255 grayscale image; obtaining a second common voltage via increasing or decreasing the first common voltage by a preset voltage offset; inputting the second common voltage to the display panel, and sequentially inputting a plurality of initial grayscale voltages corresponding to the plurality of preset grayscale to the display panel, continuously adjusting each initial grayscale voltage until the brightness of the display panel reaches the target brightness value corresponding to preset grayscale corresponding to the initial grayscale voltage every time the initial grayscale voltage is input, and obtaining a plurality of modified grayscale voltages corresponding to the plurality of preset grayscale; driving the display panel to display by using the second common voltage, the plurality of modified grayscale voltages, and a preset initial grayscale voltage corresponding to 255 grayscale. The embodiment of the present disclosure could solve the problem of ineffectiveness of eliminating unevenness caused by inaccurate mura compensation value during producing process of the liquid crystal display panel, at the same time use a common voltage which makes flicker value of the display panel to be the preset flicker value when the display panel displays the 255 grayscale image as the first common voltage, the first common voltage is the optimal common voltage when the display panel displays the 255 grayscale image, afterwards obtain the second common voltage via increasing or decreasing the first common voltage by the preset voltage offset, adjust initial grayscale voltages corresponding to the plurality of preset grayscale other than 255 grayscale according to the actual Gamma curve of the display panel based on the second common voltage, obtain a plurality of modified grayscale voltages corresponding to the plurality of preset grayscale, that is the second common voltage is used as the optimal common voltage of other greyscale except 255 greyscale, when the display panel displays, it is driven by the second common voltage, the plurality of modified grayscale voltages, and the preset initial grayscale voltage corresponding to 255 grayscale, when performing detecting image stick, which makes the display panel keep displaying alternative black and white checkerboard image, the area displaying white grid, i.e., the 255 greyscale area could generate residual direct current, when the alternative black and white checkerboard image is changed to a preset detecting grayscale image, because the residual direct current effect makes the area previously displaying white grid brighter, the brightness difference between the area previously displaying 255 grayscale and the area displaying 0 grayscale could be offset, which effectively improves the reverse image stick and improves the display quality; similarly, when the display panel performs normal displaying, the area displaying 255 grayscale also generates residual direct current, when other grayscale images are displayed later, the image of this area is brighter, offsetting the brightness difference with other areas, effectively improving the reverse image stick and improving the display quality.

Based on the above hardware structure, an embodiment of a method for adjusting greyscale of display panel is proposed.

Figure 3:
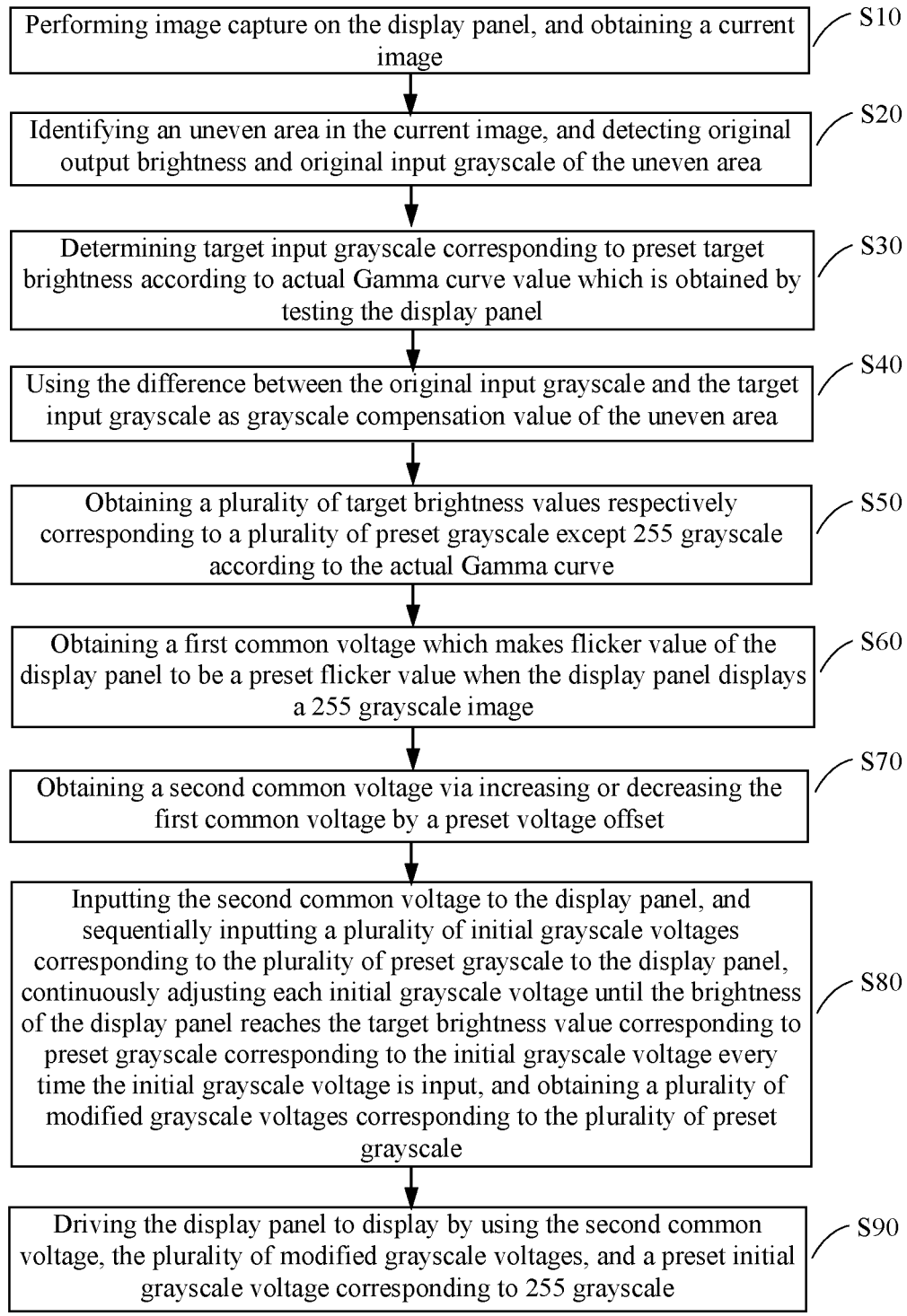
FIG. 3 is a flowchart illustrating a method for adjusting greyscale of display panel according to a first embodiment of the present disclosure.

Referring to FIG. 3, FIG. 3 is a flowchart illustrating a method for adjusting greyscale of display panel according to a first embodiment of the present disclosure In this embodiment, the method includes following steps:

S10: performing image capture on the display panel, and obtaining a current image;

It could be understood that the current image is a current display image of the display panel;

In a specific implementation, after the display panel is illuminated, the current display image (i.e., the current image) could be captured by the optical CCD camera;

It should be noted that the display panel in this embodiment may be a liquid crystal display panel, and the liquid crystal display panel could be applied to display devices such as a computer display screen, a television display screen, and a tablet computer display screen.

S20: identifying an uneven area in the current image, and detecting original output brightness and original input grayscale of the uneven area;

It could be understood that unevenness may occur in the current display image displayed by the display panel during the process of producing the display panel (i.e., there may be uneven areas appearing); when performing image capture on the display panel, extracting luminance signal of the uneven areas of the current image;

It should be noted that the luminance signal includes input grayscale and output brightness; the input grayscale is grayscale that a display could recognize, and the grayscale represents actual objective brightness, that is, an objective quantity, and the display would continuously obtain different input voltages (also called Gamma voltages), grayscale reflected different input voltages are different; the output brightness is subjective brightness perception of human eyes. Since human perception of stimuli of nature is non-linear, outside world strengthens the stimuli in a certain proportion, the stimuli is evenly increased for people; similarly, perception of human eyes of natural brightness is also non-linear, so the subjective brightness of human eyes is not exactly the same as the actual objective brightness, Gamma curve is used to coordinate the relationship between the subjective brightness perception of the human eyes and the actual objective natural brightness, i.e., to coordinate mapping relationship between the output brightness and input grayscale, it could use a formula to reflect the mapping relationship between the two: output value=input value$^{Gamma}$.

It could be understood that the output brightness value of an initial display image (i.e., the subjective brightness perception of the human eyes) is known; the grayscale value of the initially displayed picture (i.e., the input grayscale) is also known, but the display in display screen is uneven with this grayscale, i.e., there is unevenness; when detecting the uneven area, some unevenness is obvious, which the human eyes could see, some unevenness is not visible to the human eyes; uneven area in the current image is detected and identified by professional devices, that is, pixel distribution feature is analyzed according to the display data in the current collected image, and the unevenness is identified according to relevant algorithms; there are many related algorithms in the process of detecting unevenness, there are no limitations herein in this embodiment.

S30: determining target input grayscale corresponding to preset target brightness according to actual Gamma curve value which is obtained by testing the display panel;

It should be noted that, in this embodiment, there is an even brightness display area in the current image, and the output brightness value of this display area is used as the preset target brightness value;

In a specific implementation, output brightness of a center point of the panel in the current image could be acquired, and the output brightness of the center point of the panel in the current image is used as the preset target brightness. That is, the output brightness of the central area of the panel in the current image is obtained, and the brightness difference of other areas and the central area of the panel are compared based on the central area of the panel. Usually, in the actual producing process of the display panel, the center point of the display panel is the best place for optical display, therefore, when debugging the panel, the center point of the panel is used for debugging;

Optionally, obtaining output brightness of each pixel in other areas except the uneven area in the current image, and calculating an average value of obtained output brightness, using the average value of obtained output brightness as the preset target brightness.

Figure 4:
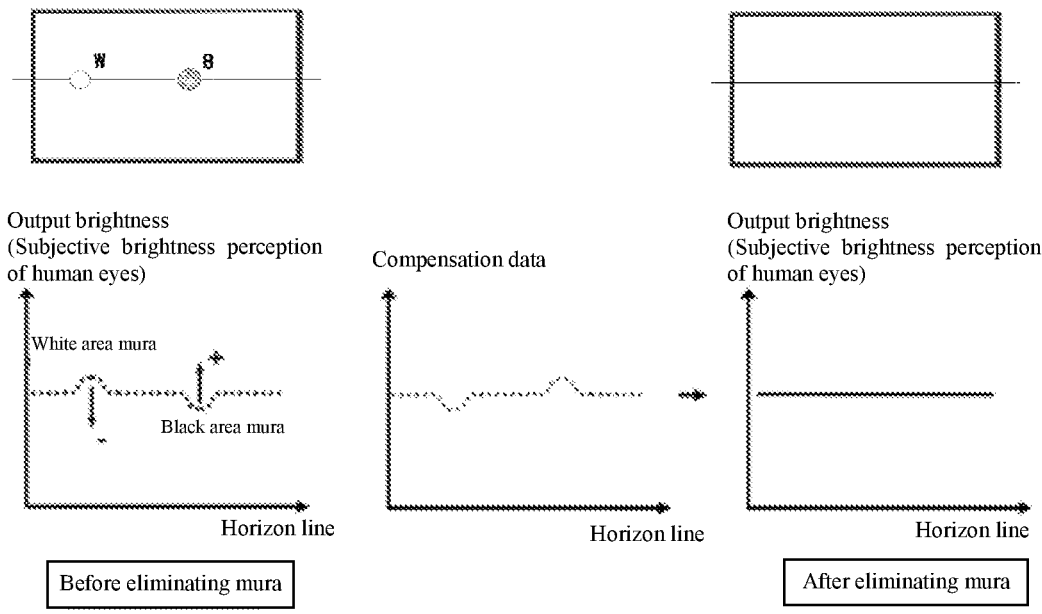
FIG. 4 is a schematic diagram illustrating principle of eliminating uneven area of display panel according to an embodiment of the present disclosure.

S40: using the difference between the original input grayscale and the target input grayscale as grayscale compensation value of the uneven area;

It could be understood that, referring to FIG. 4, it is assumed that the picture on the left has a white area unevenness W and a black area unevenness B in the horizontal direction, through the above S40, the difference between the original (input) grayscale value and the target grayscale is used as the compensation data of the uneven area (i.e., the grayscale compensation value), to perform data compensation on the two areas, that is, the display data of the areas is sum of the original display data and the compensation data, and the compensation data of the white area unevenness is negative, that is, the display data would be reduced, and the data corresponding to the black area unevenness would be increased accordingly, so uniform brightness could be obtained finally, and eliminating unevenness is achieved.

Figure 5:
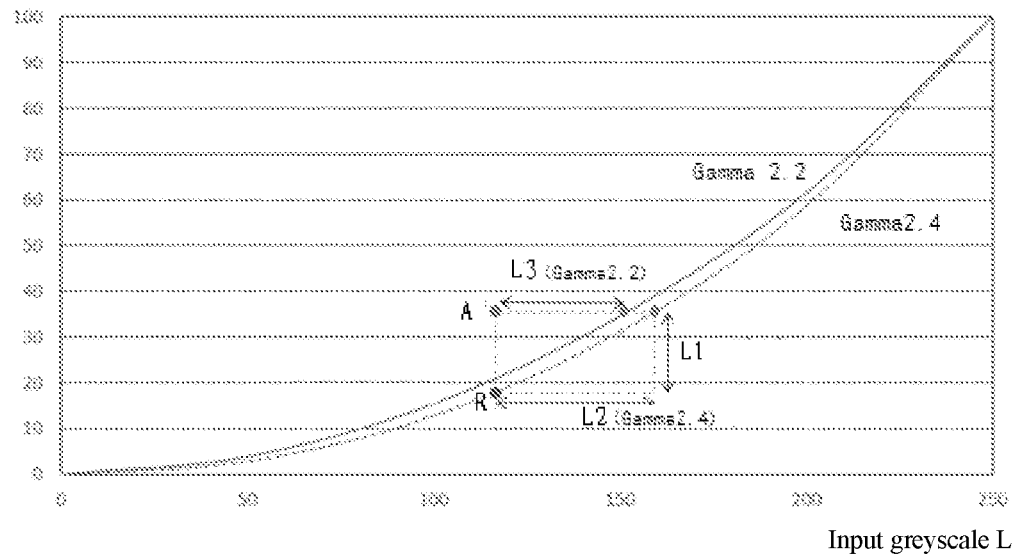
FIG. 5 is a schematic diagram illustrating principle of performing data compensation to uneven area of display panel according to an embodiment of the present disclosure.

In a specific implementation, referring to FIG. 5, it is assumed that the actual Gamma curve value of the panel is measured as 2.4, the dotted line is Gamma 2.4 curve, and the solid line is Gamma 2.2 curve; it could be seen that when same luminance difference L1 is compensated, the compensated grayscale value L3 obtained in the Gamma 2.2 curve is different with the compensated grayscale value L2 obtained in the Gamma 2.4 curve, that is, compensated grayscale values obtained in different Gamma curves are different, and the compensated grayscale value L3 in the Gamma 2.2 curve is smaller than the compensated grayscale value L2 in the actual Gamma 2.4 curve, therefore only compensation that meets characteristics of the panel itself is optimal.

Subsequent to S40, the obtained grayscale compensation value could be burned into an electrically erasable programmable read-only memory EEPROM to achieve a compensation effect of the current image, that is, the grayscale compensation value is transmitted to the display panel, so that the display panel adds the grayscale compensation value to the original input grayscale of the uneven area as a new input grayscale of the uneven area, so as to eliminate the uneven area (mura) in the current image.

In the process of manufacturing each liquid crystal panel, grayscale value compensation is performed to uneven areas of the display panel according to the actual Gamma curve and the preset target brightness, thereby achieving the most accurate compensation effect, which could eliminate unevenness (mura) in the display panel accurately and effectively.

S50: obtaining a plurality of target brightness values respectively corresponding to a plurality of preset grayscale except 255 grayscale according to the actual Gamma curve;

In a specific implementation, specific process of obtaining the actual Gamma curve of the display panel may be: providing a brilliance sensing device, making the display panel respectively display 0 grayscale image and 255 grayscale image, using the brilliance sensing device to obtain the brightness of the display panel displaying 0 grayscale image and 255 grayscale image, using the brightness of the display panel displaying 0 grayscale image and 255 grayscale image and the preset actual Gamma value to obtain the actual Gamma curve of the display panel.

S60: obtaining a first common voltage which makes flicker value of the display panel to be a preset flicker value when the display panel displays a 255 grayscale image;

In a specific implementation, obtaining the first common voltage which makes flicker value of the display panel to be the preset flicker value when the display panel displays the 255 grayscale image specifically is inputting an initial common voltage and a preset initial grayscale voltage corresponding to 255 grayscale to the display panel, which causes the display panel to display the 255 grayscale image, the flicker value of the display panel is being detected while the initial common voltage is adjusted, until the flicker value of the display panel is the preset flicker value, and the first common voltage is obtained.

S70: obtaining a second common voltage via increasing or decreasing the first common voltage by a preset voltage offset;

Optionally, the voltage offset is greater than 0 and less than or equal to 2V.

S80: inputting the second common voltage to the display panel, and sequentially inputting a plurality of initial grayscale voltages corresponding to the plurality of preset grayscale to the display panel, continuously adjusting each initial grayscale voltage until the brightness of the display panel reaches the target brightness value corresponding to preset grayscale corresponding to the initial grayscale voltage every time the initial grayscale voltage is input, and obtaining a plurality of modified grayscale voltages corresponding to the plurality of preset grayscale;

In a specific implementation, an identification module may be used to detect the brightness of the display panel to determine whether the brightness of the display panel reaches the target brightness value, and two unequal initial grayscale voltages are preset corresponding to each preset grayscale.

S90, driving the display panel to display by using the second common voltage, the plurality of modified grayscale voltages, and a preset initial grayscale voltage corresponding to 255 grayscale.

Figure 6:
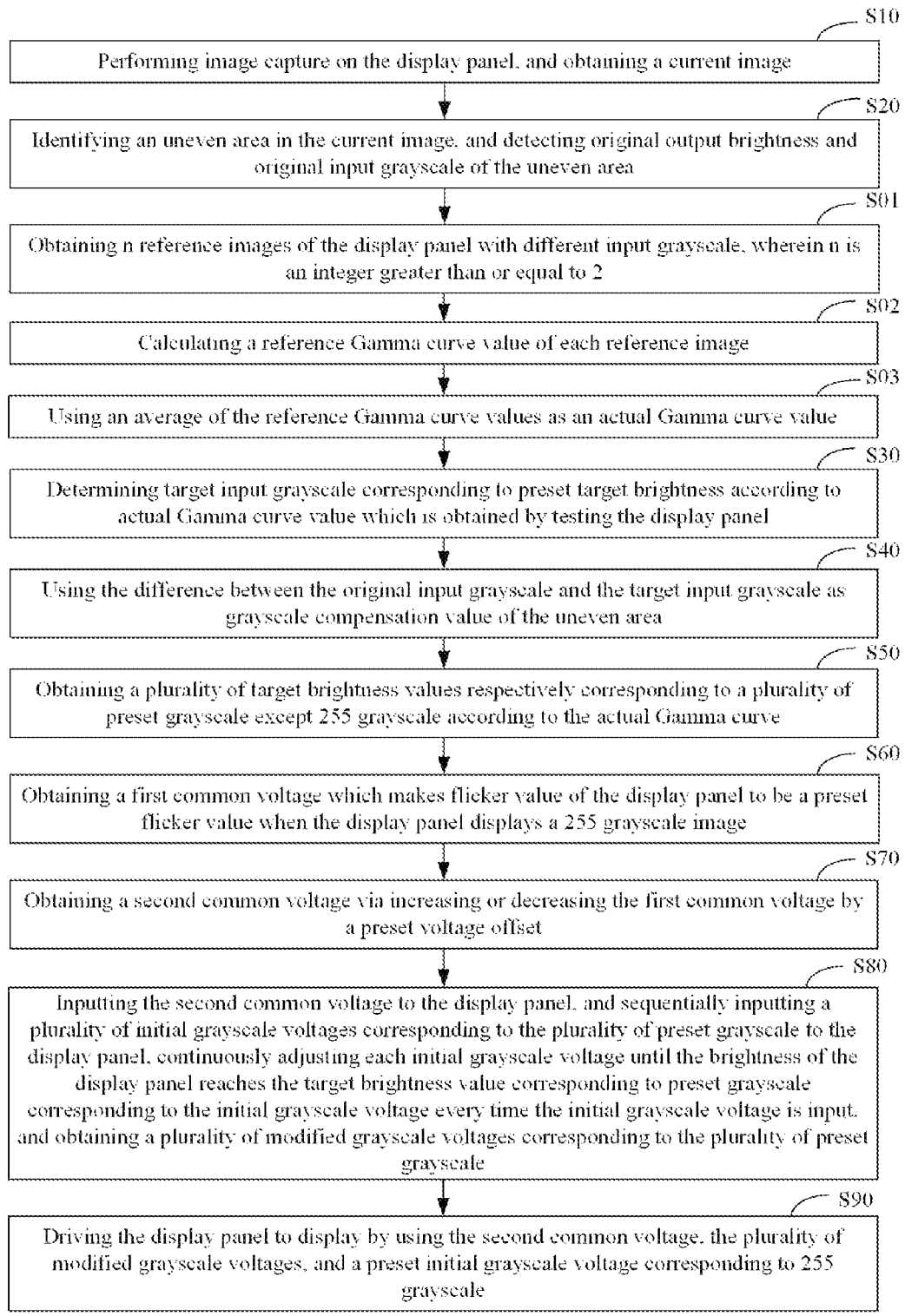
FIG. 6 is a flowchart illustrating a method for adjusting greyscale of display panel according to a second embodiment of the present disclosure.

Referring to FIG. 6, it is second embodiment of the method for adjusting greyscale of display panel, based on the above first embodiment, FIG. 6 is based on the embodiment shown in FIG. 3;

In this embodiment, prior to S30 determining the target input grayscale corresponding to the preset target brightness according to the actual Gamma curve value, the method further includes:

S01: obtaining n reference images of the display panel with different input grayscale, wherein n is an integer greater than or equal to 2;

In a specific implementation, after driving circuit illuminates the display panel, initial display state (i.e., the current image) of the current display panel could be captured by the high-resolution CCD camera, and the CCD camera additionally captures image information of display states of the current display panel with different grayscale values, the image information with different grayscale values is used as reference images, and the uneven areas in the reference images are identical to the uneven areas of the initial display state (i.e., the current image);

Depending on actual needs, additional 5 or more reference images could be taken by the CCD camera; taking 5 reference images as an example, these 5 images have 5 greyscale values assigned to the images of the display panel: the 5 images are taken as the first image is 0 greyscale, the fifth image is 255 greyscale, the middle 3 images have 3 different greyscale values. In addition, increasing the number of images does not result in too much work and difficulty, which is simple and easy.

S02: calculating a reference Gamma curve value of each reference image;

In this embodiment, the middle 3 reference images mentioned above may be detected to extract corresponding reference input grayscale values and reference output brightness; afterwards, according to the above reference input grayscale values, reference output brightness, and a Gamma mathematical model, reference Gamma curve value of each reference image is calculated, the Gamma mathematical model representing a correspondence relationship between the reference input grayscale and the reference output brightness.

It could be understood that the input grayscale value (i.e., it could represent Gamma voltage, an objective quantity of a computer recognized object) of each reference image and the output brightness value (i.e., subjective brightness perception of human eyes) have a nonlinear mapping relationship (i.e., the Gamma curve could reflect this mapping relationship between them, the mapping relationship could also be called Gamma mathematical model). This nonlinear mapping relationship usually uses a formula by default to indicate: output brightness=input grayscale$^{Gamma}$; it could be known from the above, the input grayscale value of each reference image is known; meanwhile, since the reference images are obtained by the CCD camera, the output brightness value of each reference image could be measured, the output brightness value is also known; therefore, the Gamma value of each reference picture could be obtained by the formula output brightness=input grayscale$^{Gamma}$, wherein, the Gamma value of each reference image is not the same, there would be some errors between them;

In a specific implementation, the Gamma mathematical model is:

$$\frac{Tx - To}{T255 - To} = \left(\frac{Lx}{255}\right)^{Gamma}$$

Wherein, Tx is the reference output brightness, T255 is corresponding output brightness when input grayscale is 255, To is the corresponding output brightness when the input grayscale is 0, Lx is the reference input grayscale, and Gamma is the actual Gamma curve value.

The Gamma mathematical model in this embodiment, which makes the Gamma curve value obtained by calculation of each reference image is closer to the actual Gamma curve value of the current display panel. The Gamma curve value of each reference image calculated by the above formula, the error between the calculated result and the actual Gamma curve value of the display panel could be further reduced.

S03: using an average of the reference Gamma curve values as an actual Gamma curve value.

It could be understood that, as could be seen from the above, there is an error in the Gamma curve value obtained by calculation of each reference image, therefore by obtaining the Gamma curve corresponding to the average value of their Gamma curve values, the Gamma curve closest to the actual condition of the panel could be obtained, using this Gamma curve as the actual Gamma curve, then based on the actual Gamma curve, the compensation value actually needed for each uneven area in the current image of the display panel is obtained, so as to achieve the most accurate compensation.

In this embodiment, the actual Gamma curve of the display panel is measured in advance, that is, by taking an image of the display panel with different grayscale, and combining the Gamma mathematical model to detect the reference Gamma curve value of the display panel with different grayscale, and using the average value of the reference Gamma curve values as the actual Gamma curve value that is the closest to the actual condition of the display panel, which could obtain the actual Gamma curve of the display panel effectively during the production of the display panel, thereby obtaining compensation value of the uneven area more accurately.

Figure 7:
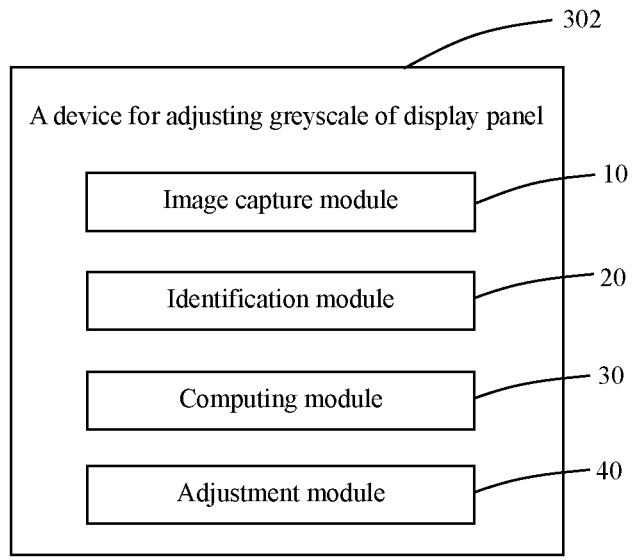
FIG. 7 is a block diagram illustrating a device for adjusting greyscale of display panel according to an embodiment of the present disclosure.

Referring to FIG. 7, it is a block diagram illustrating a device for adjusting greyscale of display panel according to an embodiment, the device for adjusting greyscale of display panel includes;

An image capture module 10, configured for performing image capture on the display panel, and obtaining a current image;

It could be understood that the current image is a current display image of the display panel;

In a specific implementation, after the display panel is illuminated, the current display image (i.e., the current image) could be captured by the optical CCD camera;

It should be noted that the display panel in this embodiment may be a liquid crystal display panel, and the liquid crystal display panel could be applied to display devices such as a computer display screen, a television display screen, and a tablet computer display screen.

An identification module 20, configured for identifying an uneven area in the current image, and detecting original output brightness and original input grayscale of the uneven area;

It could be understood that unevenness may occur in the current display image displayed by the display panel during the process of producing the display panel (i.e., there may be uneven areas appearing); when performing image capture on the display panel, extracting luminance signal of the uneven areas of the current image;

It should be noted that the luminance signal includes input grayscale and output brightness; the input grayscale is grayscale that a display could recognize, and the grayscale represents actual objective brightness, that is, an objective quantity, and the display would continuously obtain different input voltages (also called Gamma voltages), grayscale reflected different input voltages are different; the output brightness is subjective brightness perception of human eyes. Since human perception of stimuli of nature is non-linear, outside world strengthens the stimuli in a certain proportion, the stimuli is evenly increased for people; similarly, perception of human eyes of natural brightness is also non-linear, so the subjective brightness of human eyes is not exactly the same as the actual objective brightness, Gamma curve is used to coordinate the relationship between the subjective brightness perception of the human eyes and the actual objective natural brightness, i.e., to coordinate mapping relationship between the output brightness and input grayscale, it could use a formula to reflect the mapping relationship between the two: output value=input value$^{Gamma}$.

It could be understood that the output brightness value of an initial display image (i.e., the subjective brightness perception of the human eyes) is known; the grayscale value of the initially displayed picture (ie, the input grayscale) is also known, but the display in display screen is uneven with this grayscale, i.e., there is unevenness; when detecting the uneven area, some unevenness is obvious, which the human eyes could see, some unevenness is not visible to the human eyes; uneven area in the current image is detected and identified by professional devices, that is, pixel distribution feature is analyzed according to the display data in the current collected image, and the unevenness is identified according to relevant algorithms; there are many related algorithms in the process of detecting unevenness, there are no limitations herein in this embodiment.

A computing module 30, configured for determining target input grayscale corresponding to preset target brightness according to actual Gamma curve value which is obtained by testing the display panel;

It should be noted that, in this embodiment, there is an even brightness display area in the current image, and the output brightness value of this display area is used as the preset target brightness value;

In a specific implementation, output brightness of a center point of the panel in the current image could be acquired, and the output brightness of the center point of the panel in the current image is used as the preset target brightness. That is, the output brightness of the central area of the panel in the current image is obtained, and the brightness difference of other areas and the central area of the panel are compared based on the central area of the panel. Usually, in the actual producing process of the display panel, the center point of the display panel is the best place for optical display, therefore, when debugging the panel, the center point of the panel is used for debugging;

Optionally, obtaining output brightness of each pixel in other areas except the uneven area in the current image, and calculating an average value of obtained output brightness, using the average value of obtained output brightness as the preset target brightness.

An adjustment module 40, configured for using the difference between the original input grayscale and the target input grayscale as grayscale compensation value of the uneven area.

It could be understood that, referring to FIG. 4, it is assumed that the picture on the left has a white area unevenness W and a black area unevenness B in the horizontal direction, the adjustment module 40 uses the difference between the original (input) grayscale value and the target grayscale as the compensation data of the uneven area (i.e., the grayscale compensation value), and performs data compensation on the two areas, that is, the display data of the areas is sum of the original display data and the compensation data, and the compensation data of the white area unevenness is negative, that is, the display data would be reduced, and the data corresponding to the black area unevenness would be increased accordingly, so uniform brightness could be obtained finally, and eliminating unevenness is achieved.

In a specific implementation, referring to FIG. 5, it is assumed that the actual Gamma curve value of the panel is measured as 2.4, the dotted line is Gamma 2.4 curve, and the solid line is Gamma 2.2 curve; it could be seen that when same luminance difference L1 is compensated, the compensated grayscale value L3 obtained in the Gamma 2.2 curve is different with the compensated grayscale value L2 obtained in the Gamma 2.4 curve, that is, compensated grayscale values obtained in different Gamma curves are different, and the compensated grayscale value L3 in the Gamma 2.2 curve is smaller than the compensated grayscale value L2 in the actual Gamma 2.4 curve, therefore only compensation that meets characteristics of the panel itself is optimal. In the end, the obtained grayscale compensation value could be burned into an electrically erasable programmable read-only memory EEPROM to achieve a compensation effect of the current image, that is, the grayscale compensation value is transmitted to the display panel, so that the display panel adds the grayscale compensation value to the original input grayscale of the uneven area as a new input grayscale of the uneven area, so as to eliminate the uneven area (mura) in the current image.

Figure 8:
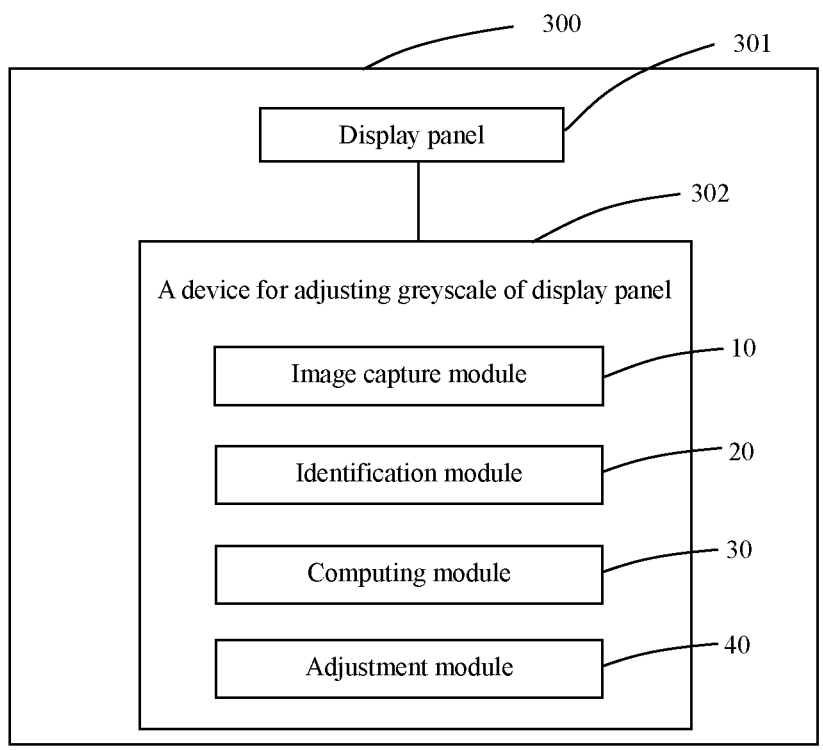
FIG. 8 is a block diagram illustrating a display device according to an embodiment of the present disclosure.

Referring to FIG. 8, it is a block diagram illustrating a display device according to an embodiment, as shown in the figure the display device 300 could include a display panel 301 and a device for adjusting greyscale of display panel 302, the device for adjusting greyscale of display panel 302 includes, An image capture module 10, configured for performing image capture on the display panel, and obtaining a current image;

An identification module 20, configured for identifying an uneven area in the current image, and detecting original output brightness and original input grayscale of the uneven area;

A computing module 30, configured for determining target input grayscale corresponding to preset target brightness according to actual Gamma curve value which is obtained by testing the display panel; and An adjustment module 40, configured for using the difference between the original input grayscale and the target input grayscale as grayscale compensation value of the uneven area.

It should be noted that the display panel in this embodiment may be a liquid crystal display panel, and the liquid crystal display panel could be applied to display devices such as a computer display screen, a television display screen, and a tablet computer display screen.

In the process of manufacturing each liquid crystal panel, the grayscale value compensation is performed on the uneven area of the display panel according to the actual Gamma curve and the preset target brightness, thereby achieving the most accurate compensation effect, and eliminating unevenness (mura) in the display panel accurately and effectively.

Further, the identification module 20 is configured to detect brightness of the display panel, so as to determine whether the brightness of the display panel reaches the target brightness value.

In addition, the present disclosure further provides a computer readable storage medium where the grayscale adjustment program of the display panel is stored, following operations are performed when the grayscale adjustment program of the display panel is executed by the processor:

Performing image capture on the display panel, and obtaining a current image;

Identifying an uneven area in the current image, and detecting original output brightness and original input grayscale of the uneven area;

Determining target input grayscale corresponding to preset target brightness according to actual Gamma curve value which is obtained by testing the display panel;

Using the difference between the original input grayscale and the target input grayscale as grayscale compensation value of the uneven area;

Obtaining a plurality of target brightness values respectively corresponding to a plurality of preset grayscale except 255 grayscale according to the actual Gamma curve;

Obtaining a first common voltage which makes flicker value of the display panel to be a preset flicker value when the display panel displays a 255 grayscale image;

Obtaining a second common voltage via increasing or decreasing the first common voltage by a preset voltage offset;

Inputting the second common voltage to the display panel, and sequentially inputting a plurality of initial grayscale voltages corresponding to the plurality of preset grayscale to the display panel, continuously adjusting each initial grayscale voltage until the brightness of the display panel reaches the target brightness value corresponding to preset grayscale corresponding to the initial grayscale voltage every time the initial grayscale voltage is input, and obtaining a plurality of modified grayscale voltages corresponding to the plurality of preset grayscale;

Driving the display panel to display by using the second common voltage, the plurality of modified grayscale voltages, and a preset initial grayscale voltage corresponding to 255 grayscale.

Further, following operations are performed when the grayscale adjustment program of the display panel is executed by the processor:

Obtaining n reference images of the display panel with different input grayscale, wherein n is an integer greater than or equal to 2;

Calculating a reference Gamma curve value of each reference image;

Using an average of the reference Gamma curve values as an actual Gamma curve value.

Further, following operations are performed when the grayscale adjustment program of the display panel is executed by the processor:

Detecting reference input grayscale and reference output brightness of each reference image;

Calculating the reference Gamma curve value of each reference image according to the reference input grayscale, the reference output brightness, and a Gamma mathematical model; the Gamma mathematical model representing a correspondence relationship between the reference input grayscale and the reference output brightness.

Further, following operations are performed when the grayscale adjustment program of the display panel is executed by the processor:

Obtaining output brightness of a center point of the current image, and using the output brightness of the center point of the current image as the preset target brightness.

Further, following operations are performed when the grayscale adjustment program of the display panel is executed by the processor:

Obtaining output brightness of each pixel in other areas except the uneven area in the current image;

Using an average value of obtained output brightness as the preset target brightness.

Further, following operations are performed when the grayscale adjustment program of the display panel is executed by the processor:

Transmitting the grayscale compensation value to the display panel, allowing the display panel to use a result of adding the grayscale compensation value to the original input grayscale of the uneven area as a new input grayscale of the uneven area, so as to eliminate the uneven area in the current image.

Further, the method includes burning the grayscale compensation value into a memory, so as to achieve a compensation effect of the current image.

Further, the display panel is a liquid crystal display panel, the liquid crystal display panel could be applied to a computer display screen, a television display screen, and a tablet computer display screen.

Further, specific process of obtaining the actual Gamma curve of the display panel is: providing a brilliance sensing device, making the display panel respectively display 0 grayscale image and 255 grayscale image, using the brilliance sensing device to obtain the brightness of the display panel displaying 0 grayscale image and 255 grayscale image, using the brightness of the display panel displaying 0 grayscale image and 255 grayscale image and the preset actual Gamma value to obtain the actual Gamma curve of the display panel.

Further, the brightness of the display panel is detected by an identification module, so as to determine whether the brightness of the display panel reaches the target brightness value.

Further, the voltage offset is greater than 0 and less than or equal to 2V.

Further, obtaining the first common voltage which makes flicker value of the display panel to be the preset flicker value when the display panel displays the 255 grayscale image, specifically is, inputting an initial common voltage and a preset initial grayscale voltage corresponding to 255 grayscale to the display panel, which causes the display panel to display the 255 grayscale image, the flicker value of the display panel is being detected while the initial common voltage is adjusted, until the flicker value of the display panel is the preset flicker value, and the first common voltage is obtained.

Further, two unequal initial grayscale voltages are preset correspond to each preset grayscale.

In this embodiment, through capturing image of the display panel with different grayscale and combining the Gamma mathematical model, the Gamma curve value of the display panel at different grayscale is detected, the average value of the Gamma curve values is used as the actual Gamma curve value closest to the actual condition of the display panel, which obtain the actual Gamma curve of the display panel effectively during the production of the display panel, thereby obtaining the grayscale value compensation value of the uneven area more accurately, which solves the problem of ineffectiveness of eliminating unevenness caused by inaccurate unevenness compensation value during process of producing the liquid crystal display panel, meanwhile, the present disclosure could drive the display panel to display by using the second common voltage, the plurality of modified grayscale voltages, and the preset initial grayscale voltage corresponding to 255 grayscale, which could generate residual direct current in the area displaying 255 grayscale, and then counteract the brightness difference with other areas when displaying other greyscale images, which improves reverse image sticking effectively and improves display quality.

It should be noted that, throughout this disclosure, the terms "include", "comprise" or any other variations thereof are intended to encompass non-exclusive inclusions, so that a process, method, article, or system that includes a series of elements would include not only those elements, but it may further include other elements that are not explicitly listed or elements that are inherent to such processes, methods, articles, or systems. In the absence of extra limitations, an element defined by the phrase "includes a . . . " does not exclude the presence of additional identical elements in this process, method, article, or system that includes the element.

Sequence numbers of the embodiments disclosed herein are meant for the sole purpose of illustrative and do not represent the advantages and disadvantages of these embodiments.

Through the above description of the foregoing embodiments, those skilled in the art can clearly understand that the above methods of the embodiments can be implemented by means of software plus a necessary general hardware platform; they certainly can also be implemented by means of hardware, but in many cases, the former is a better implementation. Based on this understanding, the essential part of the technical solution according to the present disclosure or the part that contributes to the prior art can be embodied in the form of a software product. Computer software products can be stored in a storage medium as described above (e.g., ROM/RAM, a magnetic disk, an optical disc) which includes instructions to cause a terminal device (e.g., a mobile phone, a computer, a server, an air conditioner, or a network device, etc.) to perform the methods described in the various embodiments of the present disclosure.

The foregoing description portrays merely some illustrative embodiments of the present disclosure, and are not intended to limit the patentable scope of the present disclosure. Any equivalent structural or flow transformations based on the specification and the drawing of the present disclosure, or any direct or indirect applications of the present disclosure in other related technical fields, shall all fall within the protection scope of the present disclosure.

What is claimed is:

1. A method for adjusting greyscale of display panel, wherein, the method comprises:
   performing image capture on the display panel, and obtaining a current image;
   identifying an uneven area in the current image, and detecting original output brightness and original input grayscale of the uneven area;
   determining target input grayscale corresponding to preset target brightness according to actual Gamma curve value which is obtained by testing the display panel;
   using the difference between the original input grayscale and the target input grayscale as grayscale compensation value of the uneven area;
   obtaining a plurality of target brightness values respectively corresponding to a plurality of preset grayscale except 255 grayscale according to the actual Gamma curve;
   obtaining a first common voltage when the display panel displays a 255 grayscale image;
   obtaining a second common voltage via increasing or decreasing the first common voltage by a preset voltage offset;
   inputting the second common voltage to the display panel, and sequentially inputting a plurality of initial grayscale voltages corresponding to the plurality of preset grayscale to the display panel, continuously adjusting each initial grayscale voltage until the brightness of the display panel reaches the target brightness value corresponding to preset grayscale corresponding to the initial grayscale voltage every time the initial grayscale voltage is input, and obtaining a plurality of modified grayscale voltages corresponding to the plurality of preset grayscale; and
   driving the display panel to display by using the second common voltage, the plurality of modified grayscale voltages, and a preset initial grayscale voltage corresponding to 255 grayscale.

2. The method of claim 1, wherein, prior to determining the target input grayscale corresponding to the preset target brightness according to the actual Gamma curve value, the method further comprises:
   obtaining n reference images of the display panel with different input grayscale, wherein n is an integer greater than or equal to 2;
   calculating a reference Gamma curve value of each reference image; and
   using an average of the reference Gamma curve values as an actual Gamma curve value.

3. The method of claim 2, wherein, the step of calculating the reference Gamma curve value of each reference image comprises:
   detecting reference input grayscale and reference output brightness of each reference image; and
   calculating the reference Gamma curve value of each reference image according to the reference input grayscale, the reference output brightness, and a Gamma mathematical model; the Gamma mathematical model representing a correspondence relationship between the reference input grayscale and the reference output brightness.

4. The method of claim 3, wherein, the Gamma mathematical model is:

$$\frac{Tx - To}{T255 - To} = \left(\frac{Lx}{255}\right)^{Gamma}$$

wherein, Tx is the reference output brightness, T255 is corresponding output brightness when input grayscale is 255, To is the corresponding output brightness when the input grayscale is 0, Lx is the reference input grayscale, and Gamma is the actual Gamma curve value.

5. The method of claim 2, wherein, n is an integer greater than or equal to 5.

6. The method of claim 1, wherein, prior to determining the target input grayscale corresponding to the preset target brightness according to the actual Gamma curve value, the method further comprises:

obtaining output brightness of a center point of the current image, and using the output brightness of the center point of the current image as the preset target brightness.

7. The method of claim 1, wherein, prior to determining the target input grayscale corresponding to the preset target brightness according to the actual Gamma curve value, the method further comprises:

obtaining output brightness of each pixel in other areas except the uneven area in the current image; and using an average value of obtained output brightness as the preset target brightness.

8. The method of claim 1, wherein, subsequent to using the difference between the original input grayscale and the target input grayscale as the grayscale compensation value of the uneven area, the method further comprises:

transmitting the grayscale compensation value to the display panel, allowing the display panel to use a result of adding the grayscale compensation value to the original input grayscale of the uneven area as a new input grayscale of the uneven area, so as to eliminate the uneven area in the current image.

9. The method of claim 1, wherein, the method further comprises burning the grayscale compensation value into a memory, so as to achieve a compensation effect of the current image.

10. The method of claim 1, wherein, the display panel is a liquid crystal display panel.

11. The method of claim 10, wherein, the liquid crystal display panel could be applied to a computer display screen, a television display screen, and a tablet computer display screen.

12. The method of claim 1, wherein, specific process of obtaining the actual Gamma curve of the display panel is: providing a brilliance sensing device, making the display panel respectively display 0 grayscale image and 255 grayscale image, using the brilliance sensing device to obtain the brightness of the display panel displaying 0 grayscale image and 255 grayscale image, using the brightness of the display panel displaying 0 grayscale image and 255 grayscale image and the preset actual Gamma value to obtain the actual Gamma curve of the display panel.

13. The method of claim 1, wherein, the brightness of the display panel is detected by an identification module, so as to determine whether the brightness of the display panel reaches the target brightness value.

14. The method of claim 1, wherein, the voltage offset is greater than 0 and less than or equal to 2V.

15. The method of claim 1, wherein, obtaining the first common voltage when the display panel displays the 255 grayscale image, specifically is, inputting an initial common voltage and a preset initial grayscale voltage corresponding to 255 grayscale to the display panel, which causes the display panel to display the 255 grayscale image.

16. The method of claim 1, wherein, two unequal initial grayscale voltages are preset corresponding to each preset grayscale.

\* \* \* \* \*